(12) United States Patent
Chang et al.

(10) Patent No.: US 10,394,881 B2
(45) Date of Patent: Aug. 27, 2019

(54) AUTOMATIC SUGGESTIONS TO SHARE IMAGES

(71) Applicant: Google Inc., Mountain View, CA (US)

(72) Inventors: Jason Chang, Mountain View, CA (US); Catherine Wah, San Francisco, CA (US); Loren Puchalla Fiore, Mountain View, CA (US); Teresa Ko, Los Angeles, CA (US)

(73) Assignee: Google LLC, Mountain View, CA (US)

( * ) Notice: Subject to any disclaimer, the term of this patent is extended or adjusted under 35 U.S.C. 154(b) by 9 days.

(21) Appl. No.: 15/476,631

(22) Filed: Mar. 31, 2017

(65) Prior Publication Data

US 2018/0285357 A1 Oct. 4, 2018

(51) Int. Cl.
| | |
|---|---|
| *G06K 9/00* | (2006.01) |
| *G06K 9/62* | (2006.01) |
| *G06F 16/51* | (2019.01) |
| *G06F 16/583* | (2019.01) |
| *G06Q 30/02* | (2012.01) |
| *G06Q 50/00* | (2012.01) |

(52) U.S. Cl.
CPC .......... *G06F 16/51* (2019.01); *G06F 16/5838* (2019.01); *G06K 9/00288* (2013.01); *G06K 9/6215* (2013.01); *G06Q 30/02* (2013.01); *G06Q 50/01* (2013.01); *G06K 9/00221* (2013.01)

(58) Field of Classification Search
CPC .......... G06F 17/3028; G06F 17/30256; G06F 16/51; G06F 16/5838; G06K 9/00288; G06K 9/6215; G06K 9/00221; G06Q 50/01; G06Q 30/02
See application file for complete search history.

(56) References Cited

U.S. PATENT DOCUMENTS

| | | | |
|---|---|---|---|
| 8,688,782 B1* | 4/2014 | Lin | G06Q 30/02 709/203 |
| 9,122,912 B1 | 9/2015 | Briskin et al. | |
| 9,405,964 B1* | 8/2016 | Suchland | G06K 9/00288 |
| 2012/0014560 A1 | 1/2012 | Obrador et al. | |
| 2017/0093780 A1* | 3/2017 | Lieb | G06F 17/30265 |
| 2018/0219814 A1* | 8/2018 | Maarek | H04L 51/08 |

OTHER PUBLICATIONS

Pantraki et al. "Automatic Image Tagging and Recommendation via PARAFAC2." IEEE 25th International Workshop on Machine Learning for Signal Processing, Sep. 17, 2015, 6 pages (Year: 2015).*

(Continued)

*Primary Examiner* — Jon Chang
(74) *Attorney, Agent, or Firm* — IP Spring

(57) ABSTRACT

Some implementations can include a computer-implemented method and/or system for automatic suggestions to share images containing people of importance to a user. The method can include determining, based on pixels of an image associated with a user account, one or more clusters associated with the image. The method can also include determining a share probability score for the image based on a probabilistic model and determining that the share probability score meets a threshold. The method can further include, in response to determining that the share probability score meets the threshold, providing a suggestion to a user associated with the user account to share the image.

20 Claims, 5 Drawing Sheets

(56) References Cited

OTHER PUBLICATIONS

EPO, International Search Report for International Patent Application No. PCT/US2017/059403, dated Jan. 25, 2018, 3 pages.
EPO, Written Opinion for International Patent Application No. PCT/US2017/059403, dated Jan. 25, 2018, 8 pages.
EPO, Written Opinion of the International Preliminary Examing Authority for International Patent Application No. PCT/US2017/059403, dated Feb. 21, 2019, 8 pages.

* cited by examiner

AUTOMATIC SUGGESTIONS TO SHARE IMAGES

BACKGROUND

The proliferation of digital image capture devices, such as digital cameras and phones with built-in cameras, permits users to capture a large number of digital images. Users may often remember to share certain images, such as images taken during significant events, e.g., a wedding or graduation. However, users may not remember to share other images, such as images taken during times other than significant events. Sharing such images may be useful to the users and/or to recipients of the user's shared images.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Some implementations are generally related to digital image management, and in particular to generating automatic suggestions to share digital images containing people determined to be important to a user.

Some implementations can include a computer-implemented method. The method can include a computer-implemented method comprising determining, based on pixels of an image associated with a user account, one or more clusters associated with the image. At least a first cluster of the one or more clusters can be a top ranked cluster of the user account. The method can also include determining a share probability score for the image based on a probabilistic model, and determining that the share probability score meets a threshold. The method can further include, in response to determining that the share probability score meets the threshold, providing a suggestion to a user associated with the user account to share the image.

The user account can include a plurality of images associated therewith. Each image of the plurality of images can be associated with at least one cluster of the one or more clusters. The one or more clusters can be associated with respective cluster rank values that are based on one or more of: a face quality for images in a respective cluster, a count of time periods of the respective cluster, a count of images associated with the respective cluster, a recency of images associated with the respective cluster, and a name label for the respective cluster.

The one or more clusters can be person clusters. Determining the one or more clusters can include applying a facial recognition technique to identify one or more faces in the image. The one or more faces can correspond to a respective person. The threshold can be based on one or more of: a composition of the user account and an importance score of the one or more faces.

The method can also include identifying a dominant face of the one or more faces in the image. The method can further include determining an account size for the user account, and normalizing the share probability score based on the account size.

Determining the account size can include determining a count of images associated with the user account. Normalizing the share probability score can include multiplying the share probability score by a factor calculated by dividing a sum of probability scores for images of user accounts of the account size by a count of the user accounts of the account size.

The probabilistic model can be learned from sharing data from a plurality of user accounts, and can be based on, for each user account, a first probability that a given image is shared, a second probability that a shared image includes at least one top cluster, and a third probability the given image includes at least one top ranked cluster.

Some implementations can include a system having one or more processors coupled to a non-transitory computer readable medium having stored thereon instructions that, when executed by the one or more processors, cause the one or more processors to perform operations. The operations can include determining, based on pixels of an image associated with a user account, one or more clusters associated with the image. At least a first cluster of the one or more clusters can be a top ranked cluster of the user account. The operations can also include determining a share probability score for the image based on a probabilistic model, and determining that the share probability score meets a threshold. The operations can further include, in response to determining that the share probability score meets the threshold, providing a suggestion to a user associated with the user account to share the image.

The user account can include a plurality of images associated therewith. Each image of the plurality of images can be associated with at least one cluster of the one or more clusters. The one or more clusters can be associated with respective cluster rank values that are based on one or more of: a face quality for images in a respective cluster, a count of time periods of the respective cluster, a count of images associated with the respective cluster, a recency of images associated with the respective cluster, and a name label for the respective cluster. The operations can also include determining an account size for the user account, and normalizing the share probability score based on the account size.

Normalizing the share probability score can include multiplying the share probability score by a factor calculated by dividing a sum of probability scores for images of user accounts of the account size by a count of the user accounts of the account size. The probabilistic model can be learned from sharing data from a plurality of user accounts, and can be based on, for each user account, a first probability that a given image is shared, a second probability that a shared image includes at least one top cluster, and a third probability the given image includes at least one top ranked cluster.

Some implementations can include a computer-implemented method. The method can include obtaining image account information associated with a user account, and identifying one or more person clusters associated with one or more images in the image account information associated with the user account. The method can also include determining respective importance scores for the images within the one or more person clusters, and determining a threshold based on the respective importance scores. The method can further include providing a probabilistic model for determining image sharing suggestions based on relative importance scores and the threshold.

The computer-implemented method can further include ranking the one or more person clusters according to a rank assigned to a respective person cluster. Determining the probability of the user sharing images within the one or more person clusters can be performed for top clusters (e.g., those clusters having a rank that meets a given ranking percentile threshold). The rank can be based on one or more of face quality (e.g., based on whether the face is in focus, whether the face is front on, whether the face is obscured, whether the face has a smiling expression, etc.), a count of images in the user's account with a given person in them, recency of images (e.g., within a day, week, month, etc. of a current date) in the one or more person clusters, a count of time periods (e.g., a number of unique days, a number of unique weeks, etc.) of the one or more person clusters, and whether a person in an image has been assigned a name label by the user.

The probability of the user sharing the images within the one or more person clusters can be determined according to:

$$\hat{y}_x(r) = \frac{p(s_k = 1)p(k \in K_{x,r} | s_k = 1)}{p(k \in K_{x,r})},$$

where $p(s_k=1)$ represents a probability that a user shares an image; $p(k \in K_{x,r} | s_k=1)$ represents a first probability that an image contains least one top r-percentile cluster (e.g., a top cluster), given that the image is shared; and $p(k \in K_{x,r})$ represents a second probability that an image contains at least one top r-percentile cluster.

The image account information can include a number of images in a respective account associated with the image account information. Respective importance scores can be based on the probability of the user sharing images from the one or more person clusters and a number of images in an account associated with the user.

Respective importance scores can be determined according to:

$$\hat{y}(r, a) = \frac{\sum_{x \in X_a} y_x(r)}{|X_a|},$$

wherein a, is a size of the user account and $X_a$ is a set of users with a images in their respective accounts. The size of the user account can be measured as a number of images in the user account.

The size of the user account can be measured as a number of images in the user account. Determining the one or more person clusters can include applying a facial recognition technique to identify one or more faces in the image wherein the one or more faces correspond to a respective person.

Some implementations can include a computer-implemented method comprising obtaining image account information associated with a user account, and identifying one or more person clusters associated with one or more images in the image account information associated with the user account. The method can also include determining respective importance scores for images within the one or more person clusters, and determining a threshold based on the respective importance scores. The method can further include providing a probabilistic model to determine image sharing suggestions based on the threshold.

The method can also include determining a probability that images within the one or more person clusters will be shared from the user account, the probability being based on an importance score representing a relative measure of importance of a person associated with a respective person cluster.

The probability of a user associated with the user account sharing the images within the one or more person clusters can be based on a probability that the user shares an image, a probability that one of the images contains at least one person cluster within a percentile given that the images are shared, and a probability that the images contain at least one person cluster within a given percentile. Respective importance scores can be determined based on a size of the user account and a set of users having accounts with respective account sizes similar to the size of the user account. The size of the user account can be measured as a count of images in the user account. Determining the one or more person clusters comprises applying a facial recognition technique, when the user has consented to use of such techniques, to identify one or more faces in the image wherein the one or more faces correspond to a respective person.

DETAILED DESCRIPTION

Figure 1:
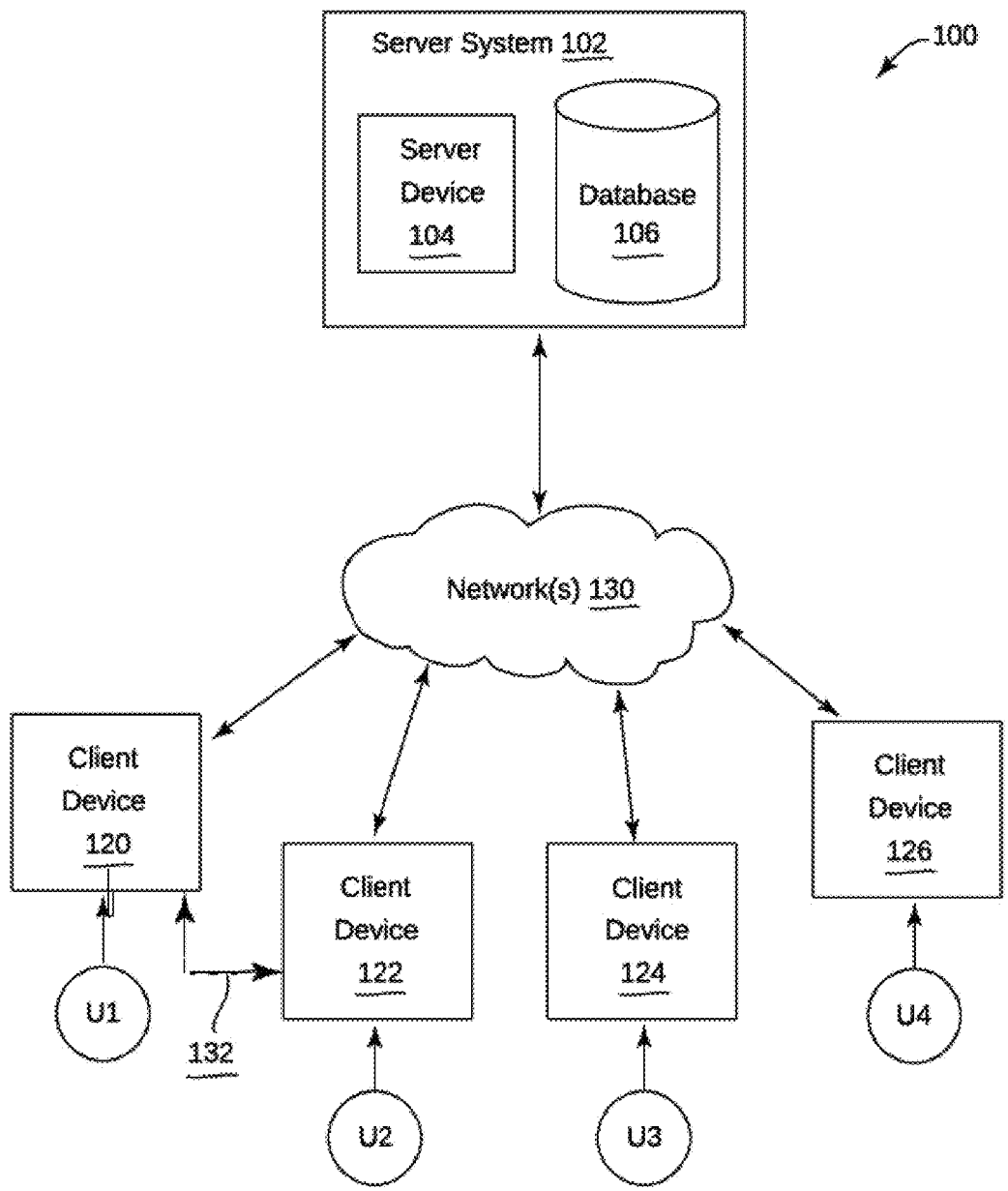
FIG. 1 is a block diagram of example systems and a network environment which may be used for one or more implementations described herein.

When making sharing suggestions to a user, it may be helpful for an image sharing suggestion system to make sharing suggestions that are in line with a user's account size (e.g., number of images) and/or previous image sharing activity. To make sharing suggestions, a probabilistic model can be used to make an inference (or prediction) about how likely a user is to share an image or group of images. For example, a user with many image collections or albums, featuring many subjects may have a higher probability of sharing images and, consequently, may welcome a higher number of sharing suggestions than a user with relatively few image collections and few previous sharing actions. Accordingly, it may be helpful to make an inference regarding a probability that a user will share an image. The inference based on the probabilistic model can include predicting a threshold number of people of importance to a particular user and making sharing suggestions in accordance with the predicted threshold for that user as inferred from the probabilistic model. The probabilistic model can be trained with data including previous sharing activity of the user. Predictions based on the probabilistic model can take into account factors such as user account size variations (e.g., variations in numbers of images in account) and for variations in sharing activity. Some implementations can include generating a sharing suggestion for one or more images containing people based on an importance score of the images. The importance score may be based on an inference from a probabilistic model that is trained using data for which respective users have provided permission for use in training the probabilistic model. Such data may include user image data, account data, and sharing data. Each image or image cluster can be annotated with probabilities of having one or more people in the image and with information about how important the one or more people in the image are relative to a respective user.

A probabilistic model can be trained and used to make an inference (or prediction) about how likely a user is to share an image cluster based on the importance of one or more people in one or more images of the image cluster. The trained model can include a statistical model of likelihood of sharing an image based on the number of images in a user's account and a cluster percentile ranking of a face cluster in the image cluster (e.g., the highest ranking face cluster relative to other face clusters in the user's account). The statistical model can include a probability distribution of likelihood of a user sharing an image based on observed frequency distribution of shared photos over person cluster occurrence.

The cluster percentile can be based on a ranking value of the face cluster representing potential importance of one or more people in the image to a user. There are various criteria that can be used to determine an important person. For example, important can include common people, represented as clusters of faces automatically grouped (e.g., using a computer vision system), that appear in a particular user's photo collection, and more specifically in photos that the user would be inclined to share. As users may have many faces appearing in photos in their accounts, it may be helpful for a sharing suggestion system to focus on images containing people important to a particular user. Moreover, user accounts can differ greatly in size and number of face/person clusters. This variation can be taken into account by a sharing suggestion system when determining important people.

The ranking value can be provided by an image management application having computer vision capabilities and can specify a cluster's relative position within a set of clusters. The ranking value can be determined from various factors that may indicate importance including one or more of: face quality, number of images in the user's account with a given face/person in them, recency of images, number of unique days of the cluster, and whether a person in an image has been assigned a name label by the user. An image management system may not need to identify or determine the specific identity of an important person. The system can determine that the person appears important (e.g., based on the ranking mentioned above) and suggest sharing the images containing the important person without having to determine an identity of the important person.

An image management system or computer vision system could use facial recognition to determine the identity of people in images in order to determine importance and to provide a sharing recommendation for a specific person based on the facial recognition. For example, the sharing suggestion system could identify an important person in an image and then recommend sharing the image with that person. Some implementations can provide an ability for individuals to opt-out of facial recognition. For example, a user could turn off facial recognition in a sharing suggestion system. In another example, users in images could opt-out of facial recognition being performed on images they are associated with (e.g., images in their own account or images in accounts of people close to them). Users can opt out of facial recognition, analysis of facial recognition data and/or use of facial recognition data. It will be appreciated that the system and methods described herein can determine important people via anonymous recognition (i.e., the sharing suggestion system determines a same person is shown repeatedly in images of a user's account, but does not perform any facial recognition to determine the identity of the person appearing in the images) of people in images of interest.

Some implementations can use the probabilistic model as a prior for inferring (or predicting) how likely it is that a user will share images containing one or more top-ranked important people. Also, from this model, some implementations learn thresholds for the probability a user will share an image. Given the probability distribution for how likely a user is to share an image, a threshold for suggesting images to share can be inferred based on the probabilistic model, which takes into account a composition of a user account and relative importance of people in the images. For example, the composition of a user account may include information such as a total number of images in the user account, a number of clusters in the user account, a number of person clusters in the user account, a number of clusters that have an associated name label (e.g., provided by a user), date or time information associated with one or more images in the user account, etc.

Some implementations can include observing a bivariate joint frequency distribution of image shares over highly ranked person clusters, thresholded by percentile, and user account size. Some implementations can also include learning a probabilistic model for sharing images of important people using the observed joint frequency distribution to learn a probabilistic model for image sharing.

Some implementations can generate a prediction of the probability a given user x with a certain account size shares an image that contains at least one cluster in the r-percentile by ranking. Let k index the image id, $k \in K_x$, where $K_x$ represents the set of x's images and $|K_x|=a_x$ is the account size of x, which may be approximated as the total number of images in all of the person clusters. $K_{x,r}$ is then the set of x's images with top r-percentile clusters. Let $s_k$ be a random variable over $k \in K_x$, such that $s_k=1$ if image k is shared and 0 if k is not shared.

Disregarding account size for now, the probability a user shares an image x that contains at least one cluster in the r-percentile is then:

$$\hat{y}_x(r) = p(s_k = 1 \mid k \in K_{x,r}) \quad (1)$$

$$\hat{y}_x(r) = \frac{p(s_k = 1)p(k \in K_{x,r} \mid s_k = 1)}{p(k \in K_{x,r})}$$

Where $p(s_k=1)$ in the numerator of Eq. 1 represents the probability a user shares any image; $p(k \in K_{x,r} \mid s_k=1)$ is the probability a shared image contains at least one top r-percentile cluster; and $p(k \in K_{x,r})$ represents the probability any image contains at least one top r-percentile cluster.

Note that a single user account has an account size a. Let $X_a$ be the set of users with a images in their account. Assuming all user accounts are independent and identically distributed (i.i.d.), the probability (or importance score) that an image that contains at least one top r-percentile cluster is shared from a user account with a images is:

$$\hat{y}(r, a) = \frac{\sum_{x \in X_a} y_x(r)}{|X_a|} \quad (2)$$

Some implementations can include normalizing the share probability score by multiplying the share probability score by a factor calculated by dividing a sum of probability scores for images of user accounts of the account size by a count of the user accounts of the account size, for example.

Some implementations can include generating similar frequency distributions for other person cluster ranking functions, including number of unique days and topicality score, and learn probabilistic models that incorporate these signals. Also, some implementations can include a signal representing which faces are dominant in images and how these correspond with important person clusters. For example, a model can include sharing statistics for images with dominant faces of important people.

An implementation of the system or method described herein can be integrated with an image sharing suggestion system. For example, a probabilistic model for the probability of sharing based on important people as described herein can be added to a configuration of an image sharing suggestion system or framework (e.g., at a server system, a cloud based computing system, or within a user device such as a mobile device, laptop or desktop computer).

Some implementations can include a method for determining whether to make a sharing suggestion based on importance of people in the image (e.g., by using the probabilistic model described herein). For a given image, the person clusters (e.g., image clusters in which one or more people are determined to be present) appearing in the image can be determined. The percentile of the top-ranked cluster in the image can be determined using the list of person clusters in a respective user's account. The probabilistic model can then be used to infer a sharing probability score for the given image. The image may then be selected for sharing based on the inferred sharing probability score.

The systems and methods provided herein may overcome one or more deficiencies of some conventional image management systems and methods. For example, image management includes enabling users to capture and/or share images (e.g., digital images represented as data stored in a nontransitory computer readable medium) with other users. With the easy availability of digital image capture devices, such as digital cameras, phones with built-in cameras, wearable devices with cameras, head-mounted devices, tablets, personal computers, etc., users may capture a large number (e.g., a hundred, a thousand, etc.) images. Conventional image management systems may enable users to share one or more of the captured images, e.g., via an online image sharing album, via a messaging service, via e-mail etc. Conventional image management systems perform sharing upon user commands to share the images. For example, a user may share images from a significant event, e.g., a wedding, a graduation, etc. with other users, e.g., friends, family members, colleagues, etc. using these systems. A user may capture numerous images outside of such significant events, e.g., during a daily commute, during a vacation, during family reunions, celebrations, and other events. The user may not remember capturing such images outside of significant events and may also not remember to share such images with other users. In this manner, conventional image management systems may not share a substantial portion of images, where sharing such images may be useful to a user.

Further, some conventional image management systems may provide suggestions to share images, e.g., based on objects (e.g., one or more faces) recognized in the images, based on a particular number of new images captured since a previous sharing activity, etc. However, such suggestions may not be accurate or useful, e.g., if the images are not of people important to the users. For example, users may have a preference to share groups of images that contain people of importance to the user. Conventional image management systems may not recognize relative importance of people in images when providing suggestions. Moreover, conventional image management systems may not learn thresholds of a number of important people for a given user or take into consideration user image account composition when determining whether to suggest sharing an image containing a person important to the user.

The example systems and methods described herein may overcome one or more of the deficiencies of conventional image management systems to provide users suggestions to share groups of images of people important to respective users. A technical problem of some conventional image management systems may be that such systems do not suggest sharing groups of images based on an importance score relative to a respective user. Further, conventional systems that provide suggestions may generate such suggestions based on attributes of individual images, or other factors that do not take into account relative importance of people pictured in images for sharing.

The disclosed subject matter relates to particular techniques to generate suggestions to share a group of images, e.g., as a single image, a group of images, or an image composition such as an image album, video, collage, etc. The suggestions are based on instantiating a process on a computer to determine whether an image cluster contains images of people important to a respective user, where the importance is determined based on the people in the image and previous image sharing behavior of the respective user. The process on the computer can determine one or more image clusters to be recommended for sharing based on people in the images and prior groups of images that were shared by the user.

Particular implementations may realize one or more of the following advantages. An advantage of generating suggestions for sharing images based on methods and system described herein is that the suggestions are based on relative importance of one or more people in the images. Another advantage is that, if an image group is not found to contain people important to a user, image sharing suggestions may not be provided, thereby reducing or eliminating generation of sharing suggestions that a user may not approve, which can result in fewer processing operations and thus reduced latency in the overall system. A further advantage of some implementations is that the suggestion can be based on a user's account composition (e.g., number of images or person image clusters), which can permit the image sharing suggestions to be tailored to variable account sizes of different users. Yet another advantage is that the methods and systems described herein can dynamically learn new thresholds (e.g., for numbers of important people, for importance score, etc.) and provide suggestions for groups of images that match the new thresholds. The systems and methods presented herein automatically provide suggestions to share a group of images that are more likely to be accepted by users, that contain images of people of relative importance to users, that enable users to share a group of images with minimal effort, and that facilitate greater sharing of images.

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example. Server system 102 can include a server device 104 and a database 106 or other storage device. Network environment 100 also can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication 132 between devices, e.g., using peer-to-peer wireless protocols.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., desktop computer, laptop computer, portable or mobile device, camera, cell phone, smart phone, tablet computer, television, TV set top box or entertainment device, wearable devices (e.g., display glasses or goggles, head-mounted display (HMD), wristwatch, headset, armband, jewelry, etc.), virtual reality (VR) and/or augmented reality (AR) enabled devices, personal digital assistant (PDA), media player, game device, etc. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102, and/or via a network service, e.g., an image sharing service, a messaging service, a social network service or other type of network service, implemented on server system 102. For example, respective client devices 120, 122, 124, and 126 may communicate data to and from one or more server systems (e.g., system 102). In some implementations, the server system 102 may provide appropriate data to the client devices such that each client device can receive communicated content or shared content uploaded to the server system 102 and/or network service. In some examples, the users can interact via audio or video conferencing, audio, video, or text chat, or other communication modes or applications. In some examples, the network service can include any system allowing users to perform a variety of communications, form links and associations, upload and post shared content such as images, image compositions (e.g., albums that include one or more images, image collages, videos, etc.), audio data, and other types of content, receive various forms of data, and/or perform socially-related functions. For example, the network service can allow a user to send messages to particular or multiple other users, form social links in the form of associations to other users within the network service, group other users in user lists, friends lists, or other user groups, post or send content including text, images, image compositions, audio sequences or recordings, or other types of content for access by designated sets of users of the network service, participate in live video, audio, and/or text video-conferences or chat with other users of the service, etc. In some implementations, a "user" can include one or more programs or virtual entities, as well as persons that interface with the system or network.

A user interface can enable display of images, image compositions, data, and other content as well as communications, privacy settings, notifications, and other data on a client device 120, 122, 124, and 126 (or alternatively on server system 102). Such an interface can be displayed using software on the client device, software on the server device, and/or a combination of client software and server software executing on server device 104, e.g., application software or client software in communication with server system 102. The user interface can be displayed by a display device of a client device or server device, e.g., a display screen, projector, etc. In some implementations, application programs running on a server system can communicate with a client device to receive user input at the client device and to output data such as visual data, audio data, etc. at the client device.

In some implementations, server system 102 and/or one or more client devices 120-126 can provide an image management program. The image management program may allow a system (e.g., client device or server device) to provide options for displaying and manipulating images and image compositions, some examples of which are described herein. The image management program can provide associated user interface(s) that are displayed on a display device associated with the server system or client device. The user interface may provide various options to a user to select images and/or users, generate image compositions, etc. Other applications can also be used with one or more features described herein, such as browsers, email applications, communication applications, etc.

Various implementations of features described herein can use any type of system and/or service. For example, social networking services, image collection and sharing services, assisted messaging services or other networked services (e.g., connected to the Internet) can include one or more described features accessed by client and server devices. Any type of electronic device can make use of features described herein. Some implementations can provide one or more features described herein on client or server devices disconnected from or intermittently connected to computer networks. In some examples, a client device including or connected to a display device can examine and display images stored on storage devices local to the client device (e.g., not connected via a communication network) and can provide features and results as described herein that are viewable to a user.

Figure 2:
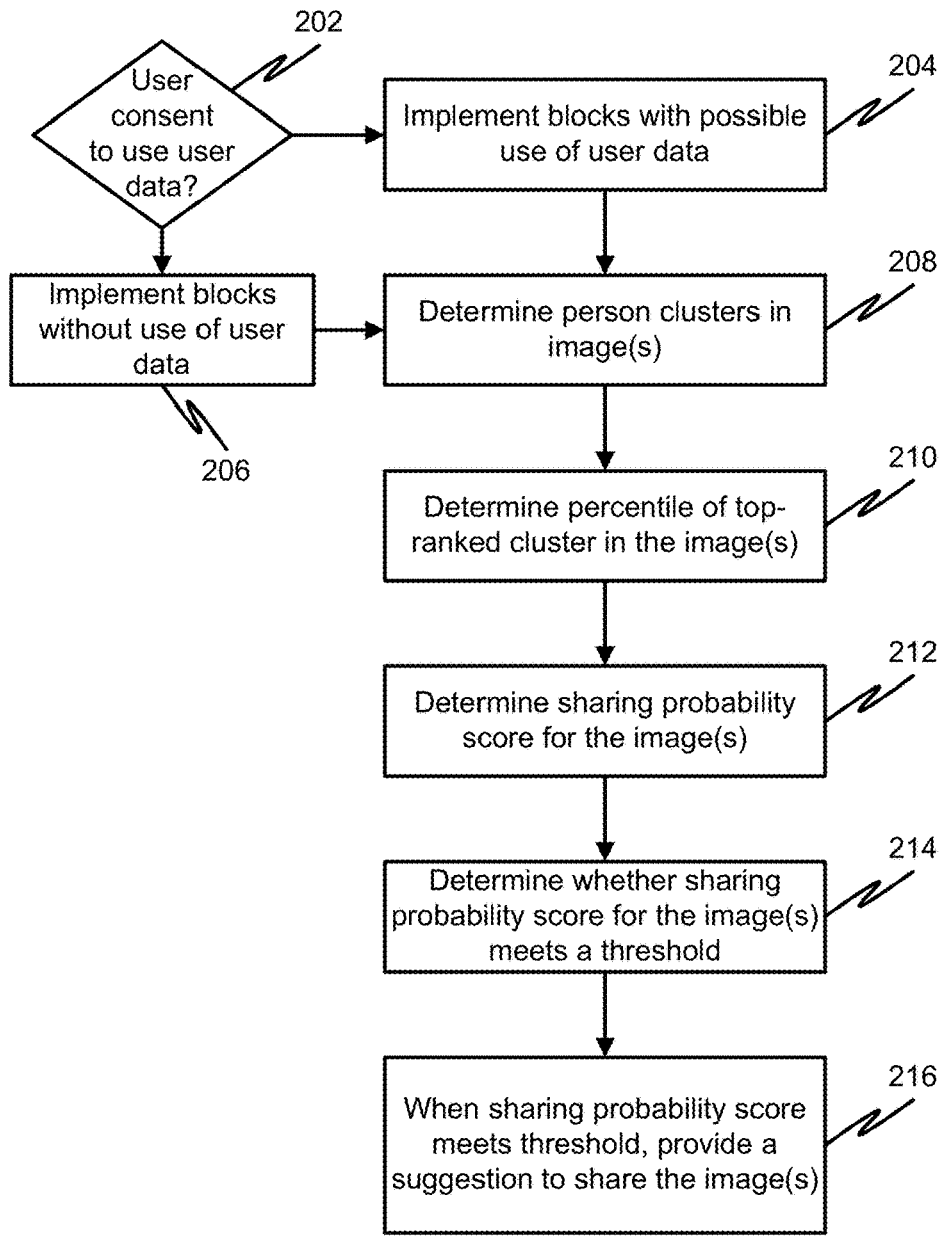
FIG. 2 is a flow diagram illustrating an example method of automatically providing a share suggestion based on a probabilistic model, according to some implementations.

FIG. 2 is a flow diagram illustrating an example method 200 to provide a suggestion to share an image using a probabilistic model (e.g., as described herein), according to some implementations.

In some implementations, method 200 can be implemented, for example, on a server system 102 as shown in FIG. 1. In other implementations, some or all of the method 200 can be implemented on one or more client devices 120, 122, 124, or 126 as shown in FIG. 1, one or more server devices, and/or on both server device(s) and client device(s). In described examples, the implementing system includes one or more digital hardware processors or processing circuitry ("processors"), and one or more storage devices (e.g., a database 106 or other storage). In some implementations, different components of one or more servers and/or clients can perform different blocks or other parts of the method 200.

Some implementations can initiate method 200 based on user input. A user may, for example, have selected the initiation of the method 200 from a displayed user interface. In some implementations, method 200 or portions thereof can be performed with guidance by the user via user input.

In some implementations, the method 200, or portions of the method, can be initiated automatically by a device. For example, the method (or portions thereof) can be periodically performed, or performed based on the occurrence of one or more particular events or conditions. For example, such events or conditions can include a particular application being opened by a user, obtaining one or more images that have been newly captured by, uploaded to, or otherwise accessible by a device (e.g. a user device), a predetermined time period having expired since the last performance of method 200, and/or one or more other events or conditions occurring which can be specified in settings of a device implementing method 200. In some implementations, such conditions can be previously specified by a user in stored custom preferences of the user (accessible by a device or method with user consent). In some examples, a device (server or client) can perform the method 200 with access to a large collection of accessible images, e.g., a user's collection of images (if user consent is received). In another example, a camera, cell phone, tablet computer, wearable device, or other client device can capture one or more images and can perform the method 200. In addition, or alternatively, a client device can send one or more captured images to a server over a network, and the server can process the images using method 200.

In block 202, it is checked whether user consent (e.g., user permission) has been obtained to use user data in the implementation of method 200. For example, user data can include user preferences, user images in an image collection (e.g., images captured by a user, uploaded by a user, or otherwise associated with a user), information about a user's social network and/or contacts, user characteristics (identity, name, age, gender, profession, etc.), social and other types of actions and activities, calendar and appointments, content, ratings, and opinions created or submitted by a user, a user's geographical location, historical user data, etc. One or more blocks of the methods described herein may use such user data in some implementations. Block 202 may be performed as part of a sharing suggestion framework and/or to verify consent provided at the sharing suggestion framework level such that blocks 204 and on will only be invoked if user consent for performing the sharing suggestions was obtained at the sharing suggestion framework level. If user consent has been obtained from the relevant users for which user data may be used in the method 200, then in block 204, it is determined that the blocks of the methods herein can be implemented with possible use of user data as described for those blocks, and the method continues to block 208. If user consent has not been obtained, it is determined in block 206 that blocks are to be implemented without use of user data, and the method continues to block 208. In some implementations, if user consent has not been obtained, the remainder of method 200 is not performed, and/or particular blocks needing the user data are not performed.

In block 208, cluster(s) in one or more images are determined. For example, the clusters may be person clusters, e.g., associated with a person that appears in the one or more images. In some implementations, when users consent to such analysis, facial recognition techniques that analyze pixels of the one or more images may be utilized to determine the clusters. The person clusters can be determined by another application (e.g., a photo management application) and data corresponding to the clusters can be added to the images as annotations and/or provided to the sharing suggestion application as separate data. The method continues to 210.

Analyzing pixels of one or more images can include identifying a dominant face of the one or more faces in the one or more images. For example, the dominant face may be a face having the largest size (e.g., measured in number of pixels) of the faces in the one or more images. In another example, the dominant face may be a face determined to be at a central point, e.g., in focus, at the geometric center of the image. In yet another example, the dominant face may be determined based on a detected expression on the one or more faces, e.g., a face with a strong expression may be determined as the dominant face. In a further example, the dominant face may be based on one or more facial features. The dominant face can then be used to determine a person cluster that the one or images belong to.

In block 210, the percentile of the top ranked person cluster(s) is determined using the list of person clusters in the respective user's account. The method continues to block 212.

In block 212, a share probability score (or sharing probability) of the one or more images is inferred using the probabilistic model. For example, a sharing probability score (or importance score) can be determined for the one or more images according to Equation (2) above. The method continues to block 214.

In block 214, it is determined whether the share probability score meets a threshold. The method continues to 216.

In block 216, images having a share probability score that meets the threshold may be selected to provide a sharing suggestion. The selection of images can include selecting images based on one or more of thresholds. For example, a first threshold for the number of important people (e.g., a threshold number of important people to provide sharing suggestions to a user based on the user's account information) and a second threshold based on a sharing probability threshold. For example, the important people sharing suggestion system may provide an indication of the selected images for sharing suggestion to a sharing suggestion system or framework. In another example, the important people sharing method or system may be included as a module or unit within an image sharing suggestion system or architecture. For example, an important person sharing suggestion could be provided to a sharing suggestion system that causes a user interface element to be displayed that gives the user the opportunity to share the image(s) according to the suggestion, modify the images suggested for sharing, or not share the images. The images can be shared via email, text message, and/or private message within a social network. Some implementations can include automatic sharing of images according to a sharing suggestion. Automatic sharing may be performed in accordance with a user's preferences and settings for automatic sharing.

In some implementations, one or more persons recognized in the images (e.g., using a facial recognition technique, if permitted by the user) can be selected as suggested recipients of the images to be shared. In some implementations, an image of the one or more selected persons can be included along with the important person sharing suggestion provided to a sharing suggestion system. Another system (e.g., facial recognition system, photo system, social network system, or the like) can, with the permission of the corresponding users, identify a user from the images of the one or more selected persons and can provide a user identity for suggesting sharing the images with. For example, the important person sharing suggestion system could generate a sharing suggestion of images with two other users shown in the images. The sharing suggestion along with an image of one or more of the other two users could be provided to a sharing suggestion system. When users have provided consent, the sharing suggestion system sends the image of the two other users to a facial recognition system and receives identity information corresponding to one or both of the two other users as a returned result, e.g., when the facial recognition system obtains a successful match between the image and identity information. In various examples, the identity information can include one or more of an email address, a user name, or other identity information. The returned result includes only such identity information as consented to by the respective user of the two other users. The sharing suggestion system provides some or all of the identity information to the user along with a suggestion to share the images. For example, in some implementations, the identity information is presented as a suggestion of whom to share the images of important people with. In some implementations, the identity information can also be used to determine other people to share the images with. For example, it can be determined whether the identity information corresponds to one or more people in a group or other related activity (e.g., colleagues, sports teammates, classmates, etc.) based on group information that is consented for such user. Upon determining that the identity information corresponds to one or more people in a group or related activity, the suggestion of people to share the image with can include one or more people in the group or related activity that are not detected in the image.

An image may be a static image (e.g., a single frame with no motion), an animated image, a video (e.g., with a plurality of frames), etc. For example, a static image may depict one or more faces with a fixed expression, while an animated image may depict one or more faces with expressions that change within the image (e.g., a live photo that captures a face with eyes transitioning between closed and open, face with the mouth moving from a non-smiling to a smiling position, etc.) A video may include a plurality of frames that depict one or more persons. Suggestions may be provided to share any type of image, and may include a group of images of different types.

In FIG. 2, various blocks (e.g., blocks 202-216) are illustrated as being performed sequentially. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks. The table can then be used to determine thresholds based on values in the table.

Figure 3:
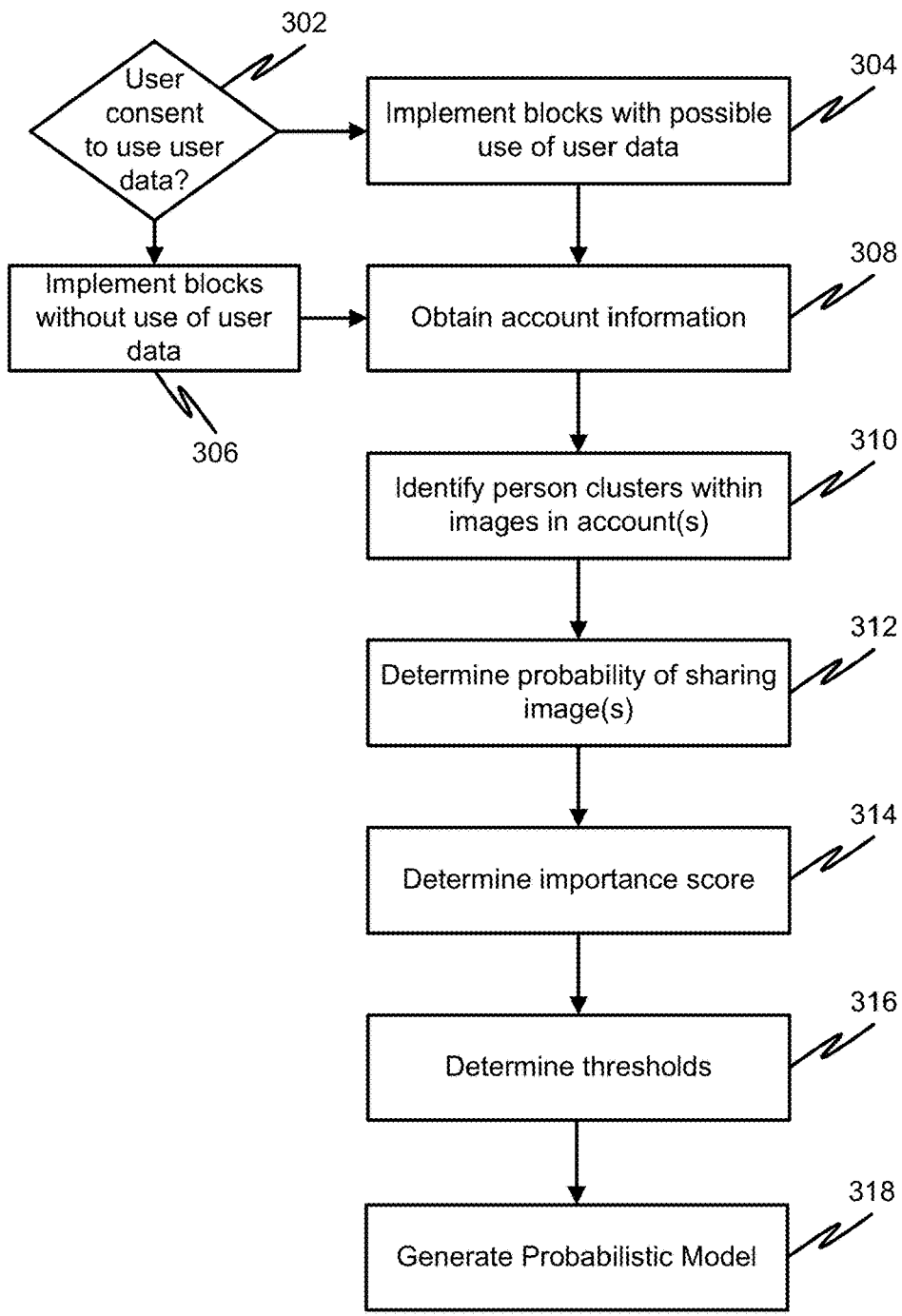
FIG. 3 is a flow diagram illustrating an example method of building and training a probabilistic model to automatically provide a share suggestion of images of important people, according to some implementations.

Block 212 of FIG. 2 describes utilizing a probabilistic model to generate a share probability score. FIG. 3 shows an example process to generate such a probabilistic model.

In some implementations, when users permit the use of sharing data, the probabilistic model may be based on sharing data from sharing data for such users. For example, with user consent, different probabilities (e.g., used in equation 1 below) may be determined for each user account and be used to determine the probability that a given image is shared from a particular user account. The probabilities may be aggregated (e.g., across a plurality of users that provide consent to such use of their sharing data) to provide a statistical distribution for sharing probabilities. Such statistical distribution is used in the probabilistic model. In generating the statistical distribution, user accounts of users who do not consent to such of sharing data are excluded. Further, metadata regarding whether an image is shared and whether the image includes a top cluster may be used, and no use is made of image content and/or user account specific cluster information, such as cluster names.

FIG. 3 is a flow diagram illustrating an example method 300 for building and training a probabilistic model that can be used to generate inferences for image sharing suggestions, according to some implementations.

In some implementations, method 300 can be implemented, for example, on a server system 102 as shown in FIG. 1. In other implementations, some or all of the method 300 can be implemented on one or more client devices 120, 122, 124, or 126 as shown in FIG. 1, one or more server devices, and/or on both server device(s) and client device(s). In described examples, the implementing system includes one or more digital hardware processors or processing circuitry ("processors"), and one or more storage devices (e.g., a database 106 or other storage). In some implementations, different components of one or more servers and/or clients can perform different blocks or other parts of the method 300.

Some implementations can initiate method 300 based on user input. A user may, for example, have selected the initiation of the method 300 from a displayed user interface. In some implementations, method 300 or portions thereof can be performed with guidance by the user via user input.

In some implementations, the method 300, or portions of the method, can be initiated automatically by a device. For example, the method (or portions thereof) can be periodically performed, or performed based on the occurrence of one or more particular events or conditions. For example, such events or conditions can include a particular application being opened by a user, obtaining one or more images that have been newly captured by, uploaded to, or otherwise accessible by a device (e.g. a user device), a predetermined time period having expired since the last performance of method 300, and/or one or more other events or conditions occurring which can be specified in settings of a device implementing method 300. In some implementations, such conditions can be previously specified by a user in stored custom preferences of the user (accessible by a device or method with user consent). In some examples, a device (server or client) can perform the method 300 with access to a large collection of accessible images, e.g., a user's collection of images (if user consent is received). In another example, a camera, cell phone, tablet computer, wearable device, or other client device can capture one or more images and can perform the method 300. In addition, or alternatively, a client device can send one or more captured images to a server over a network, and the server can process the images using method 300.

In block 302, it is checked whether user consent (e.g., user permission) has been obtained to use user data in the implementation of method 300. For example, user data can include user preferences, user images in an image collection (e.g., images captured by a user, uploaded by a user, or otherwise associated with a user), information about a user's social network and/or contacts, user characteristics (identity, name, age, gender, profession, etc.), social and other types of actions and activities, calendar and appointments, content, ratings, and opinions created or submitted by a user, a user's geographical location, historical user data, etc. One or more blocks of the methods described herein may use such user data in some implementations. Block 302 may be performed as part of a sharing suggestion framework and/or to verify consent provided at the sharing suggestion framework level such that blocks 304 and on will only be invoked if user consent for performing the sharing suggestions was obtained at the sharing suggestion framework level. If user consent has been obtained from the relevant users for which user data may be used in the method 300, then in block 304, it is determined that the blocks of the methods herein can be implemented with possible use of user data as described for those blocks, and the method continues to block 308. If user consent has not been obtained, it is determined in block 306 that blocks are to be implemented without use of user data, and the method continues to block 308. In some implementations, if user consent has not been obtained, the remainder of method 300 is not performed, and/or particular blocks needing the user data are not performed.

In block 308, image account information associated with one or more users is obtained. For example, the account information can include information regarding images captured by a user, e.g., with any of client devices 120-126. In another example, the images associated with the account may be uploaded by the user, e.g., to an online image library of the user. In another example, the plurality of images may be obtained by the user, e.g., by performing a scan (e.g., using an optical scanner device) of printed images. In another example, the plurality of images may be received by the user, e.g., via a photo application, over a messaging service, via e-mail, through use of a social network service, etc.

In some examples, images associated with the account may include respective metadata or annotations. For example, a client device that captures an image may include metadata such as capture date, capture time, capture location, camera make/model, capture settings (e.g., aperture, shutter speed, ISO, focus mode, etc.), a filename of the image, etc. In another example, an image may include user-generated metadata, e.g., tags associated with portions of the image, comments or other text associated the image, etc. In another example, an image or a group of images may be annotated to indicate the presence of one or more people in the images (e.g., as an indication of a person cluster within the images) and a ranking of the people in the images indicating potential importance to a respective user. The method continues to block 310.

In block 310, person clusters within images in the account are identified. The method continues to block 312.

In block 312, a probability of the user sharing the image is determined. For example, the probability that a user shares an image can be determined according to Equation (1) above. The probability that a user (x) shares an image of at least one person in a given percentile of the ranking (e.g., in the top r percentile) can be determined according to the formula $y_x(r)=(Pr[\text{an image is shared}] \times Pr[\text{an image is top r percentile, given that it is shared}])/Pr[\text{the image is in the top r percentile}]$. Where: Pr[an image is shared]=number of shared images divided by total number of images; Pr[an image is top r percentile, given that it is shared]=number of shared images in top r percentile divided by number of shared images; and Pr[the image is in the top r percentile]=number of images in top r percentile divided by total number of images. The method continues to block 314.

In block 314, importance score is determined. For example, importance score can be determined for a given user having an account of size a according to Equation (2) above. The method continues to block 316.

In block 316, one or more thresholds can be determined based on the importance scores determined in block 314. For example, a table can be constructed for the importance score and used to set variable thresholds. The columns of the table can correspond to account size a (e.g., number of photos in account). The rows of the table can indicate if the image contains at least one person cluster in the top r percentile based on ranking. The method continues to block 218.

At block 318, a trained probabilistic model is generated. The model can be based on the importance scores and thresholds. The probabilistic model can be provided for making sharing suggestions of images of important people.

In FIG. 3, various blocks (e.g., blocks 302-318) are illustrated as being performed sequentially. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks. The table can then be used to determine thresholds based on values in the table.

Figure 4:
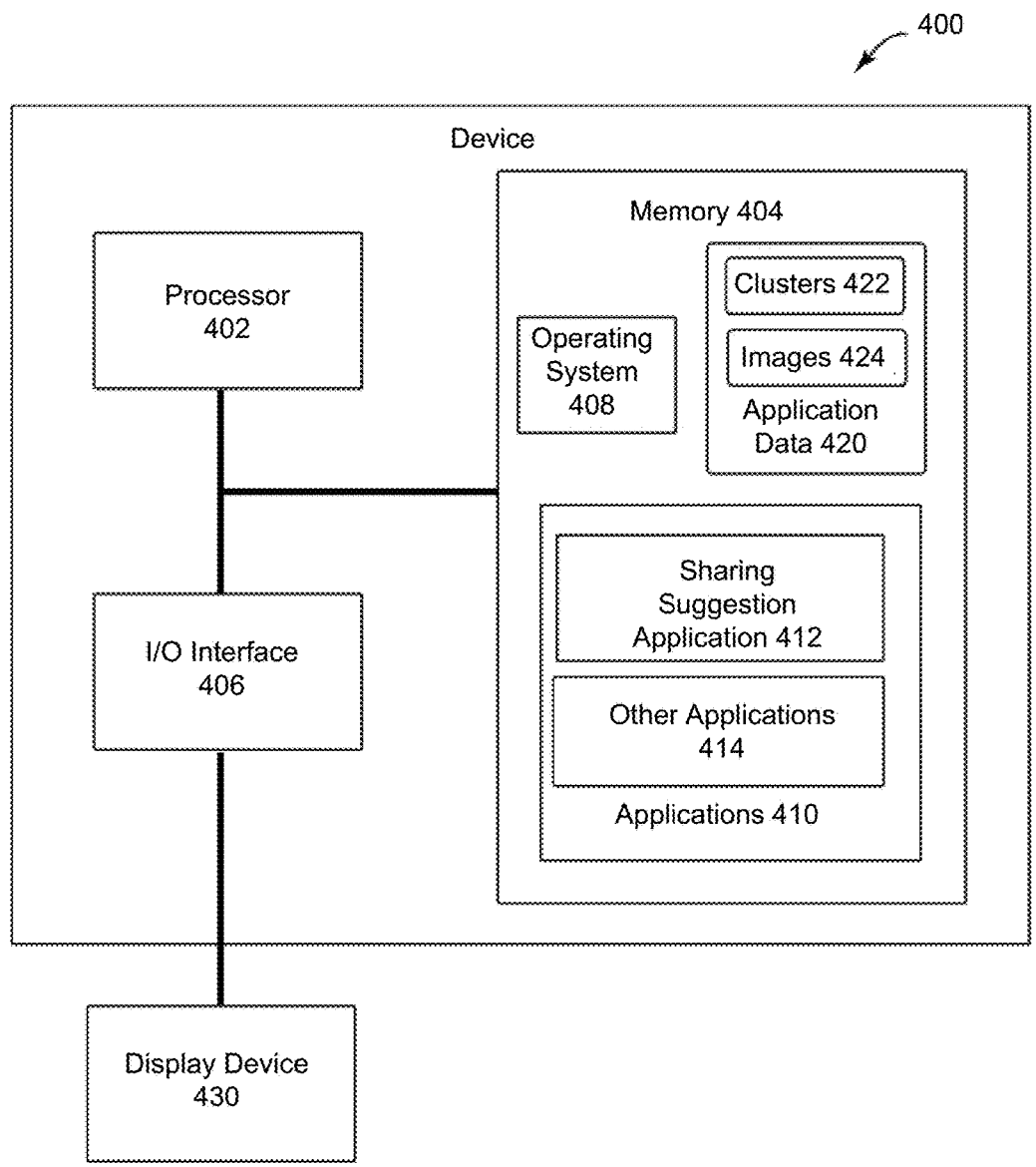
FIG. 4 is a block diagram of an example device which may be used for one or more implementations described herein.

FIG. 4 is a block diagram of an example device 400 which may be used to implement one or more features described herein. In one example, device 400 may be used to implement a computer device, e.g., a server device (e.g., server device 104 of FIG. 1), and perform appropriate method implementations described herein. Device 400 can be any suitable computer system, server, or other electronic or hardware device. For example, the device 400 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 400 includes a processor 402, a memory 404, and input/output (I/O) interface 406.

Processor 402 can be one or more processors and/or processing circuits to execute program code and control basic operations of the device 400. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 404 is typically provided in device 400 for access by the processor 402, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 402 and/or integrated therewith. Memory 404 can store software operating on the server device 400 by the processor 402, including an operating system 408, one or more applications 410, e.g., a graphics editing engine, web hosting engine, social networking engine, etc. and application data 420. In some implementations, applications 410 can include instructions that enable processor 402 to perform the functions described herein, e.g., some or all of the methods of FIG. 2.

For example, applications 410 can include an image management application 412, which as described herein can provide image viewing, manipulation, sharing, and other functions, e.g., providing displayed user interfaces responsive to user input to display user-selectable elements. In some implementations, the image management application(s) can include image editing to receive user input, select input images, modify pixels of images (e.g., by applying edit operations to an input image), provide output causing display of images and/or suggestions on a display device of the device 400. Other applications or engines 414 can also or alternatively be included in applications 410, e.g., email applications, SMS and other phone communication applications, web browser applications, media display applications, communication applications, web hosting engine or application, social networking engine or application, etc. Any of software in memory 404 can alternatively be stored on any other suitable storage location or computer-readable medium. In addition, memory 404 (and/or other connected storage device(s)) can store images, shared album data, sharing models, user data and preferences, and other instructions and data used in the features described herein. Memory 404 and any other type of storage (magnetic disk, optical disk, magnetic tape, or other tangible media) can be considered "storage" or "storage devices."

For example, application data 420 can include clusters 422 and one or more images 424. For example, clusters 422 may include a cluster ranking for clusters containing people. Further, clusters 422 may include an importance score as described above. Images 424 can include a plurality of images and associated metadata. For example, when device 400 is a client device, images 424 can be images captured by a camera of the client device (not shown). In another example, when device 400 is a server device, images 424 can be images stored at the server (e.g., uploaded to the server from client device). In some implementations, image metadata may be stored along with, or separately from images 424.

I/O interface 406 can provide functions to enable interfacing the server device 400 with other systems and devices. For example, network communication devices, storage devices (e.g., memory and/or database 106), and input/output devices can communicate via interface 406. In some implementations, the I/O interface can connect to interface devices including input devices (keyboard, pointing device, touchscreen, microphone, camera, scanner, etc.) and/or output devices (display device, speaker devices, printer, motor, etc.). Display device 430 is one example of an output device that can be used to display content, e.g., one or more images provided in an image sharing interface or other application as described herein. Display device 430 can be connected to device 400 via local connections (e.g., display bus) and/or via networked connections and can be any suitable display device, some examples of which are described below.

For ease of illustration, FIG. 4 shows one block for each of processor 402, memory 404, I/O interface 406, and software blocks 408 and 410. These blocks may represent one or more processors or processing circuitries, operating systems, memories, I/O interfaces, applications, and/or software modules. In other implementations, device 400 may not have all of the components shown and/or may have other elements including other types of elements instead of, or in addition to, those shown herein. While server system 102 is described as performing operations as described in some implementations herein, any suitable component or combination of components of system 102 or similar system, or any suitable processor or processors associated with such a system, may perform the operations described.

A client device can also implement and/or be used with features described herein, e.g., client devices 120-126 shown in FIG. 1. Example client devices can be computer devices including some similar components as the device 400, e.g., processor(s) 402, memory 404, and I/O interface 406. An operating system, software and applications suitable for the client device can be provided in memory and used by the processor, e.g., image management software, client group communication application software, etc. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device 430, for example, can be connected to (or included in) the device 400 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

Figure 5:
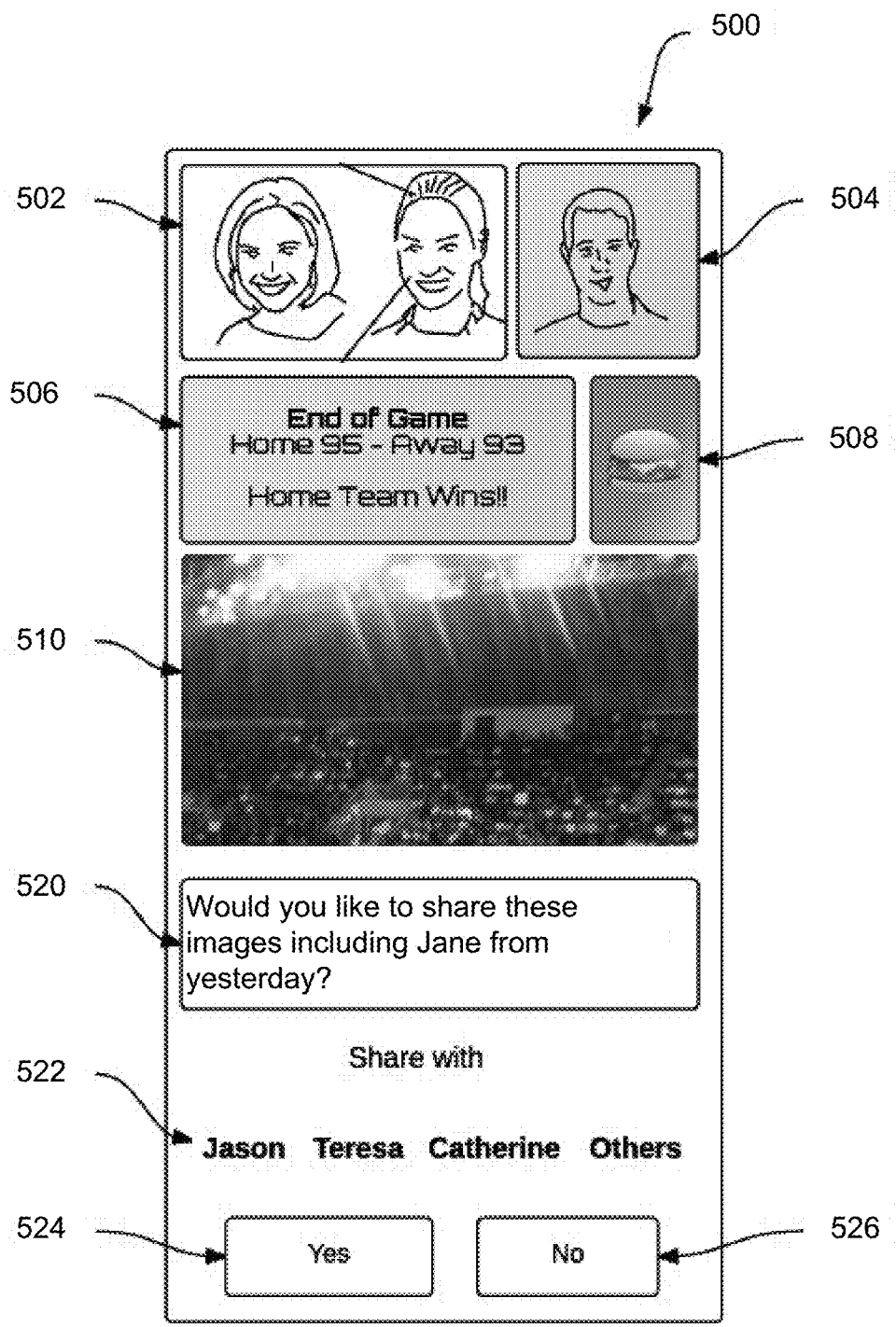
FIG. 5 is a diagrammatic illustration of an example of user interface to provide suggestion to share one or more images, according to some implementations.

FIG. 5 is a diagrammatic illustration of an example of user interface 500 to provide a sharing suggestion for one or more images, according to some implementations. User interface 500 includes thumbnail images (502, 504, 506, 508, and 510). For example, images 502-510 may be thumbnails corresponding to a plurality of images that are identified as those associated with a person determined to be important to a given user, where importance is determined as described herein. While FIG. 5 shows five images 502-510, in various implementations, any number of images may be included in user interface 500. In some implementations, e.g., implementations that do not include an image preview, thumbnail images 502-510 may not be included in user interface 500. In some implementations, information about the images, e.g., people pictured, timestamp, location, labels, etc. may be displayed in addition to or alternative to thumbnails 502-510.

User interface 500 further includes text 520 "Would you like to share an album with these images of Jane from yesterday?" In some implementations, a person pictured in one or more of the images (e.g., images 502-510) may match a top ranked person cluster (e.g., as described above with reference to FIGS. 2 and 3) and one or more portions of text 520 may be based on the first cluster. For example, as shown in FIG. 5, the portion may be "Jane," e.g., if the text "Jane" is associated with the top ranked person cluster. In some implementations, text 520 may be omitted. In some implementations, when users consent to use of image data, text 520 may include one or more additional portions, e.g., "from yesterday" that is based on data associated with one or more of the plurality of images (e.g., images 502-510) e.g., image metadata, e.g., location, timestamp, etc. In some implementations, text 520 may indicate a type of composition that will be shared, e.g., "an album". In some implementations, text 520 may include default text, e.g., "Do you want to share these images?", and not include portions based on the first cluster and/or data associated with the plurality of images.

User interface 500 further includes one or more elements 522 ("Jason", "Teresa", "Catherine", "Others"). In some implementations, elements 522 may be user-selectable, e.g., the users may select an element to indicate whether the image composition is to be shared with a user corresponding to the element 522 (e.g., "Jason"). In some implementations, a user element 522 (e.g. "Others") when selected may present additional options, e.g., to select additional users with whom the image composition is shared. In some implementations, the elements 522 may be selected based on the person cluster associated with the images 502-510. For example, the elements 522 may be selected to include a user "Jane" who is associated with images 502-510 (e.g., depicted in the images, associated with a cluster that includes one or more of the images, etc.) In some implementations, elements 522 may refer to sharing modalities (e.g., e-mail, social network, instant message, website, etc.) instead of or in addition to elements that correspond to other users. In some implementations, one or more of the sharing modalities may be indicated as a default, e.g., when user permits analysis of prior sharing behavior, e-mail may be indicated as default based on the user having previously shared images using e-mail. In some implementations, user interface 500 may be displayed as part of a photo or image management application. In some implementations, user interface 500 may be displayed as a notification, e.g., as a suggestion card.

User interface 500 also includes user-selectable elements 524 ("Yes") and 526 ("No"). In some implementations, one or more images may be shared in response to receiving user input (e.g., selection of user-selectable element 524) or not shared in response to receiving user input (e.g., selection of user-selectable element 526). In some implementations, e.g., if the user indicates a preference for automatic sharing of images, the image(s) may be shared automatically, and user-selectable elements 524 and 526 may be omitted.

In different implementations, user interface 500 may include a variety of different user interface components (e.g., as illustrated in FIG. 5). In some implementations, one or more user interface components may be omitted or additional components not shown in FIG. 5 may be included.

One or more methods described herein (e.g., method 200 or 300) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., a storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Due to the nature of generating a sharing suggestion based on analysis of people pictured in images, implementations discussed herein may require access to user data such as images and current, historical or future image sharing actions of relevant users. In situations in which certain implementations discussed herein may collect or use personal information about users (e.g., user data, user image data, image sharing data, information about a user's social network, user's location and time, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. In addition, certain data may be treated in one or more ways before it is stored or used so that personally identifiable information is removed (e.g., the sharing suggestion system may anonymously identify important people by features other than personally identifiable information such as name or user name). As one example, a user's identity may be treated so that no personally identifiable information can be determined. As another example, a user's geographic location or a location associated with user images may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

We claim:
1. A computer-implemented method comprising:
   determining one or more person clusters associated with an image by analyzing a set of pixels corresponding to the image to identify a dominant face from one or more faces in the image as measured by a number of pixels from the set of pixels associated with the dominant face,
wherein at least a first cluster of the one or more person clusters is a top ranked cluster of a user account associated with the image;
determining a share probability score that describes a probability of a user associated with the user account sharing the image within the one or more person clusters based on a probabilistic model;
determining that the share probability score meets a threshold; and
in response to determining that the share probability score meets the threshold, providing a suggestion to the user associated with the user account to share the image.

2. The computer-implemented method of claim 1, wherein the user account has a plurality of images associated therewith, wherein each image of the plurality of images is associated with at least one cluster of the one or more person clusters, and wherein the one or more person clusters are associated with respective cluster rank values that are based on one or more of: a face quality for images in a respective cluster, a count of time periods of the respective cluster, a count of images associated with the respective cluster, a recency of images associated with the respective cluster, and a name label for the respective cluster.

3. The computer-implemented method of claim 1, wherein determining the one or more person clusters comprises applying a facial recognition technique to identify the dominant face from the one or more faces in the image and wherein the one or more faces correspond to a respective person.

4. The computer-implemented method of claim 3, wherein the threshold is based on one or more of: a composition of the user account and an importance score of the one or more faces.

5. The computer-implemented method of claim 1, further comprising ranking the one or more person clusters according to a rank assigned to a respective person cluster of the one or more person clusters.

6. The computer-implemented method of claim 1, further comprising:
determining an account size for the user account; and
normalizing the share probability score based on the account size.

7. The computer-implemented method of claim 6, wherein determining the account size comprises determining a count of images associated with the user account.

8. The computer-implemented method of claim 6, wherein normalizing the share probability score comprises multiplying the share probability score by a factor calculated by dividing a sum of probability scores for images of user accounts of the account size by a count of the user accounts of the account size.

9. The computer-implemented method of claim 1, wherein the probabilistic model is learned from sharing data from a plurality of user accounts, and is based on, for each of the plurality of user accounts, a first probability that a given image is shared, a second probability that a shared image includes at least one top cluster, and a third probability the given image includes at least one top ranked cluster.

10. A system comprising:
one or more processors coupled to a non-transitory computer readable medium having stored thereon instructions that, when executed by the one or more processors, cause the one or more processors to perform operations including:
determining one or more person clusters associated with an image by analyzing a set of pixels corresponding to the image to identify a dominant face from one or more faces in the image as measured by a number of pixels from the set of pixels associated with the dominant face,
wherein at least a first cluster of the one or more person clusters is a top ranked cluster of a user account;
determining a share probability score that describes a probability of a user associated with a user account sharing the image within the one or more person clusters based on a probabilistic model;
determining that the share probability score meets a threshold; and
in response to determining that the share probability score meets the threshold, providing a suggestion to the user associated with the user account to share the image.

11. The system of claim 10, wherein the user account has a plurality of images associated therewith, wherein each image of the plurality of images is associated with at least one cluster of the one or more person clusters, and wherein the one or more clusters are associated with respective cluster rank values that are based on one or more of: a face quality for images in a respective cluster, a count of time periods of the respective cluster, a count of images associated with the respective cluster, a recency of images associated with the respective cluster, and a name label for the respective cluster.

12. The system of claim 10, wherein the operations further include:
determining an account size for the user account; and
normalizing the share probability score based on the account size.

13. The system of claim 12, wherein normalizing the share probability score comprises multiplying the share probability score by a factor calculated by dividing a sum of probability scores for images of user accounts of the account size by a count of the user accounts of the account size.

14. The system of claim 10, wherein the probabilistic model is learned from sharing data from a plurality of user accounts, and is based on, for each user account, a first probability that a given image is shared, a second probability that a shared image includes at least one top cluster, and a third probability the given image includes at least one top ranked cluster.

15. A computer-implemented method comprising:
obtaining image account information associated with a user account;
determining one or more person clusters associated with images by analyzing a set of pixels corresponding to each image to identify a dominant face from one or more faces in the image as measured by a number of pixels from the set of pixels associated with the dominant face;
determining respective importance scores for the images within the one or more person clusters;
determining a threshold based on the respective importance scores; and
providing a probabilistic model to determine image sharing suggestions based on the threshold.

16. The computer-implemented method of claim 15, further comprising determining a probability that the images within the one or more person clusters will be shared from the user account, the probability being based on an importance score representing a relative measure of importance of a person associated with a respective person cluster.

17. The computer-implemented method of claim 16, wherein the probability of a user associated with the user account sharing the images within the one or more person clusters is based on a probability that the user shares an image, a probability that one of the images contains at least one person cluster within a percentile given that the images are shared, and a probability that the images contain at least one person cluster within a given percentile.

18. The computer-implemented method of claim 15, wherein respective importance scores are determined based on a size of the user account and a set of users having accounts with respective accounts sizes similar to the size of the user account.

19. The computer-implemented method of claim 18, wherein the size of the user account is measured as a count of the images in the user account.

20. The computer-implemented method of claim 15, wherein determining the one or more person clusters comprises applying a facial recognition technique to identify one or more faces in each image wherein the one or more faces correspond to a respective person.

* * * * *